Nov. 10, 1964    J. E. BURKE    3,156,747
METHOD OF MAKING FUEL COMPACTS FOR NEUTRONIC SYSTEMS

Filed April 20, 1950    3 Sheets-Sheet 2

WITNESSES:

INVENTOR:
JOSEPH E. BURKE
BY

United States Patent Office 3,156,747
Patented Nov. 10, 1964

3,156,747
METHOD OF MAKING FUEL COMPACTS FOR NEUTRONIC SYSTEMS
Joseph E. Burke, Ballston Lake, N.Y., assignor to the United States of America as represented by the United States Atomic Energy Commission
Filed Apr. 20, 1950, Ser. No. 157,098
3 Claims. (Cl. 264—21)

This invention relates to a process for preparing compacts for neutronic systems, and more particularly to a process for preparing relatively high-density, non-pyrophoric compacts of a predetermined density and hydrogen to metal ratio, containing pyrophoric material such as plutonium, uranium and compounds thereof. It also relates to the products formed by the above process.

As a result of the extensive development of neutronic research, combinations of hydrogen and uranium have become of great importance. This is due to the fact that hydrogenous material is effective in slowing neutrons to an energy at which uranium has a large cross section so that the combination is useful in many neutronic systems. In using these combinations it is advantageous to have them available in compacts of the highest possible density in the interest of efficiency of the system. Further, it is highly desirable to be able to make compacts of a predetermined density and hydrogen to metal ratio according to close dimensional tolerances and to be able to change the density of the compacts and vary the ratio of the components contained therein conveniently and readily and with a minimum waste of active material such as uranium or plutonium. Uranium hydride has proved to be the optimum combination of uranium and hydrogen for neutronic systems as this combination furnishes considerably higher densities than other combinations of these two element. In fact, the hydrogen density in uranium hydride is actually 5 percent greater than it is in paraffin, a material having one of the highest hydrogen densities among hydrocarbons.

In spite of the above recognized advantages of uranium hydride for use in neutronic systems it has not been possible to use it extensively in this application prior to this time. This is because no method, prior to this invention, has been developed for making satisfactory compacts of it. Heretofore, the chief method of making these compacts has been by compressing the hydride particles by various means. The high pyrophoricity of compacts made by this method makes its use impracticable. In addition, they are unstable in air and so soft and friable that they cannot be readily handled. Further, it was impossible by these prior methods to produce a product of a predetermined density or one having a sufficiently high density. In fact, it has not been possible prior to this invention to produce uranium and hydrogen containing compacts of high density having a hydrogen-uranium ratio greater than three.

It is, therefore, an object of this invention to provide an improved process for making compacts for neutronic systems.

It is another object of this invention to provide a method of making high density, non-pyrophoric compacts of predetermined densities and hydrogen to metal ratios from fissionable and source material.

It is still another object of this invention to provide a method of producing high density compacts comprising uranium and/or compounds thereof, the compacts having a hydrogen-uranium ratio greater than three.

It is a further object of this invention to provide a method of making high density compacts comprising pyrophoric radioactive material which compacts are stable in air, easily handled and non-pyrophoric.

It has been found that the above and other objects are accomplished according to the method of this invention by intimately mixing in predetermined amounts, particles of fissionable and source materials with a polymeric hydrocarbon plastic of known hydrogen content and forming compacts from the resultant mixture by pressing under predetermined conditions of temperature and pressure. The hydrogen-metal ratio of the compacts may be changed without reprocessing the active or fissionable material by dissolving the plastic bonding material out of the formed compacts and refabricating the residue of active material into compacts having a different density.

In the practice of the invention, predetermined amounts of substantially pure active metal and/or metal compounds are treated with a solution of a predetermined amount of a plastic material in a suitable solvent and the solvent evaporated from the mixture. The resultant mixture is then dried, ground to the desired particle size if necessary, and formed into compacts of the desired density and dimensions.

The densities referred to throughout this specification and in the drawings are based only on the weight of uranium and hydrogen in the mixtures, so unless otherwise specified, values given are "hydride" densities, the term "hydride" comprising various hydrogen-metal ratios rather than any particular chemical compound. The hydrogen included in this hydride density may occur in the molecules of either the uranium hydride or plastic binder. Likewise, formulas in quotation marks, such as "$UH_3$", refer to hydrogen-uranium ratios rather than to compounds.

Reference is made to the accompanying drawings made a part of this specification for the purpose of illustration only but in no way intended to limit the scope of the present invention.

Figure 1:
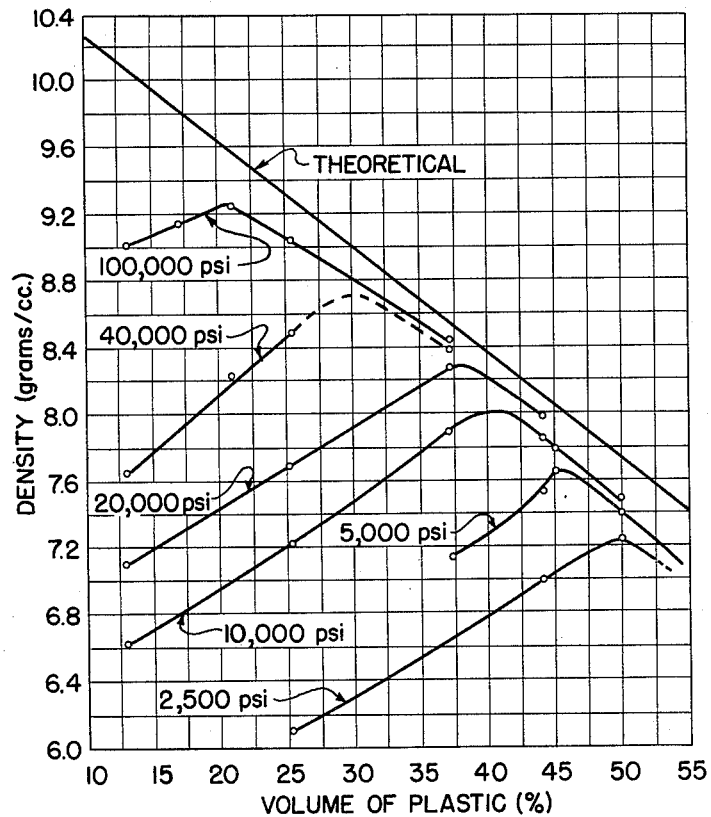
FIGURE 1 is a graph of experimental results showing the effect of pressure and of amount of plastic on "hydride" density of polyethylene-bonded compacts when the ratio of hydrogen to uranium is maintained at 3:1.

The following disclosure of applications of the invention to the making of compacts, in which uranium and/or compounds thereof comprise the active material are given as merely illustrative of the invention and are in no way intended to limit the scope thereof as various modifications will be obvious to those skilled in the art.

A mixture of 15.87 grams of finely divided pure uranium metal powder and 11.17 grams of finely divided pure uranium hydride powder was treated in an inert atmosphere with 1.40 grams of polyethylene dissolved in anhydrous benzene. This amounts to approximately 45 percent by volume of plastic. The amounts of ingredients used were those determined to give a product having a density of 7.2 when compressed under the proper conditions of temperature and pressure. The mixing was continued for a sufficient length of time to insure suspension of the individual particles in the plastic solution. The mixed paste was then poured in thin layers on stainless steel trays and the benzene permitted to evaporate. In order to break up the benzene-free mixture for charging in a die and to eliminate any segregation which may have been caused by settling during the drying operation, the dried mix was ground by milling for about two hours in a small rod mill. It has been found that most of the high-plastic content mixtures must be ground after drying. The powder thus formed was then charged into a die and compressed at a pressure of 10,000 p.s.i. at a temperature of 150° C. and the finished compacts allowed to cool under pressure. The resulting compacts were found to have the expected density, were non-pyrophoric, stable in air and withstood an indefinite amount of handling without breakage.

A second batch of compacts was made by mixing 269.1 grams of finely divided uranium hydride with 61.45 grams of hydrogenated polystyrene dissolved in anhydrous benzene. This amounts to about 72.1 percent by volume of plastic. The amounts of ingredients used were those determined to give a density of 3.05. The mixture was dried and ground as in the above example and compacts formed from it by pressing under 3,000 p.s.i. and at a temperature of 100° C. The resulting compacts were found to have the expected density as well as properties comparable to the compacts formed in the above example. Polystyrene and polyisobutylene were each substituted for the above plastics in the process and found to be equally effective in producing a product of predetermined density and having the required properties.

For some applications, it is advisable to be able to change the uranium-hydrogen ratio of the compacts by a process not requiring production of additional uranium hydride compound. For doing this it is preferable that the plastic used be soluble in some solvent which is inert to uranium metal and uranium hydride particles so that the plastic can be dissolved out of the compacts and the same uranium hydride powder used to make blocks of a different hydrogen-uranium ratio. Although the mixtures of uranium hydride and polyalkene plastic have many advantages, reduced or hydrogenated polystyrene rather than polyethylene is used where extraction of the plastic is desirable as it is not easy to extract polyethylene from the finished compact due to its limited solubility. The extraction of plastic from the compacts is accomplished by mixing them with benzene, centrifuging to remove the uranium and uranium hydride, washing with benzene to remove residual plastic and then adding the correct amount of new plastic for the next composition if a higher hydrogen-uranium ratio is desired. To attain lower hydrogen-uranium ratios a plastic-uranium metal-uranium hydride composition is added to the residue from the extraction process. It is necessary to use substantially anhydrous benzene in this stage of the process to prevent serious oxidation of the hydride. Using the above procedure it is possible to change the hydrogen-uranium ratios in a short time so that high production rates are possible.

Although the active materials used in the above examples are either uranium hydride or mixtures of uranium with uranium hydride, other active materials may obviously be used. Other compounds of uranium such as uranium oxide have been found suitable. Also, plutonium and its compounds, among others, are adaptable to the invention. The active material used should be in the form of a finely divided powder in order to produce a more homogeneous product.

The plastic used is a controlling feature of the invention. Its selection will depend largely on the properties required in the final product. Since the high hydrogen content of the plastic is determinative in obtaining a high-density formed article, particularly for low hydrogen-metal ratios and, since an article having this property is required for neutronic systems, hydrogenous binders are selected which have a high hydrogen to carbon ratio. It should be noted that the thermalizing effect on fast neutrons resulting in the compacts of this invention is due in part to hydrogen in the plastic as well as to the hydrogen in metal hydride.

Among plastics found to be suitable for the purposes of the invention are polystyrene, hydrogenated polystyrene, polyethylene and polyisobutylene. Polystyrene and hydrogenated polystyrene have carbon to hydrogen ratios of 1:1 and 1:1.75 respectively, and the polyalkene plastics have a carbon to hydrogen ratio of 1:2. Of course copolymers of these and other unsaturated hydrocarbons may be similarly employed. Any of these plastics may be hydrogenated after polymerization.

Polystyrene $(C_8H_8)_n$ has an approximate density of 1.06, a molding temperature between 150° C. to 170° C. and is readily soluble in benzene which can be easily evaporated from the hydride-plastic mixture. In addition it has good molding properties, a high softening temperature and good strength. Hydrogenated polystyrene $(C_8H_{14})_n$ may be made by the catalytic hydrogenation of polystyrene. It has an approximate density of 0.95, a molding temperature of approximately 100° C. and is soluble in benzene. This material has nearly as low a carbon to hydrogen ratio as polyethylene but is much more soluble than even polystyrene in cold benzene. It is useful in making those higher hydrogen compositions such as "$UH_{10}$" and "$UH_{30}$" from which it might be desirable to later remove some of the plastic by solvent extraction prior to refabrication to a composition such as "$UH_3$." Polyethylene $(C_2H_4)_n$ has an approximate density of 0.92, molding temperature of 150° C. and is soluble in hot benzene. The above physical constants are, of course, dependent on the degree of polymerization of the plastic.

Figure 2:
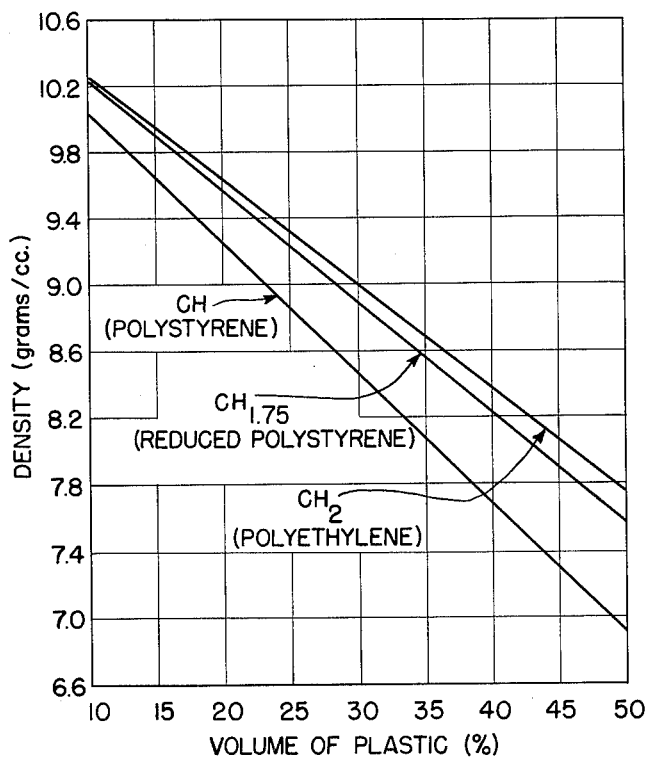
FIGURE 2 is a graph based on theoretical calculations showing the effect of composition of plastic on "hydride" density at various plastic concentrations when the hydrogen to uranium ratio is maintained at 3:1.
Figure 3:
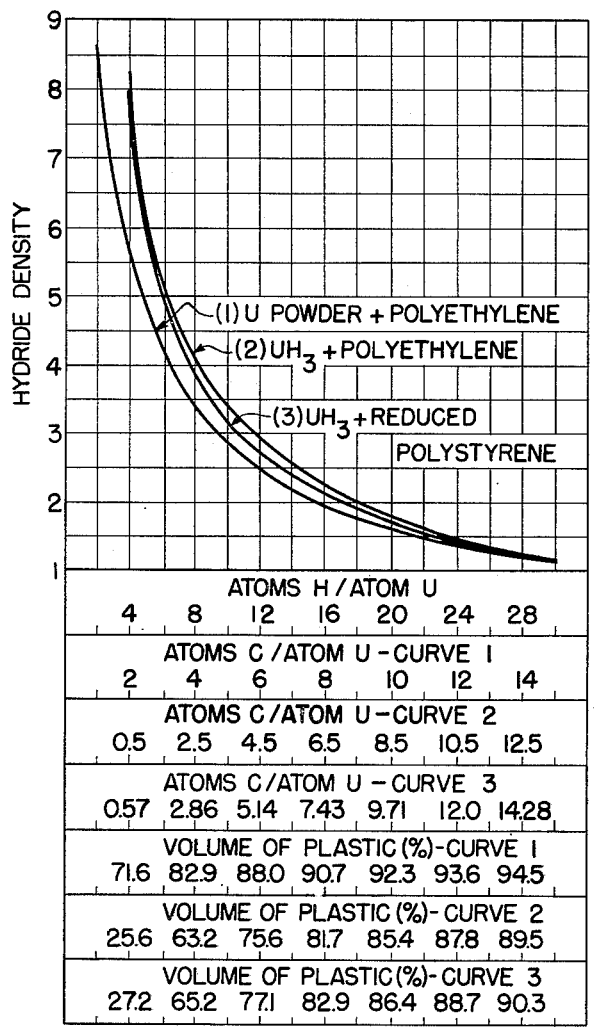
FIGURE 3 is a graph based on theoretical calculations showing the effect of plastic composition on "hydride" density at various plastic concentrations and hydrogen-uranium ratios.

The proportionate amounts of ingredients used will depend on the density required in the final product and may be arrived at with the aid of graphs similar to those of FIGURE 1 and FIGURES 2 and 3 showing the results of experimental work and theoretical calculations respectively to establish optimum conditions for making compacts having a desired hydrogen-uranium ratio. It can be seen from FIGURE 1 that for any given pressing pressure there is some plastic content at which a maximum density is obtained. When plastic contents such as 22 percent by volume are used the compact produced by pressing at very high pressures, such as 100,000 p.s.i., is not stable in air. It has been found that about 25 percent by volume of polyethylene plastic for instance is the smallest amount that can be used to give a compact which will not crack on standing. The optimum amount of plastic used in the practice of the invention generally does not exceed about 95 percent by volume. It has also been found as a general rule that by increasing the amount of plastic in the compositions the stability of the compact increases. When the higher hydrogen-uranium ratios are desired more resin is needed to provide the necessary hydrogen.

The method of mixing the plastic with active material is not restricted to the use of a solution of the plastic as other methods may be used, such as, mechanical mixing by grinding or by milling with dry plastic. However, it has been found that the solution method is the most effective when pyrophoric material is used as it insures that the individual particles are rendered non-pyrophoric. This is highly important to protect the particles in the formed product from oxidation so that a non-pyrophoric compact results. The mixing must be done in an inert atmosphere such as carbon-dioxide, helium, argon or nitrogen in order to prevent spontaneous combustion of the highly pyrophoric materials such as uranium hydride and uranium metal. The viscosity of the plastic solution must be controlled rather closely for if it is too thin the particles will rapidly separate and if too viscous it is difficult to attain homogeneity in mixing. The amount of plastic solution used will of course depend on the particular plastic used, its concentration and the amount of active material used.

Although other methods of drying the mixed paste may obviously be used the method of drying by spreading in thin layers on trays proved highly satisfactory. Stainless steel trays were used as the plastic separates rapidly and easily from them. Some plastics stick seriously to metal or enamel trays. For them, heavy cellophane has been found satisfactory as a tray lining since most plastics investigated separated readily from it when dry. In the case of uranium hydride, in order to avoid moisture pickup by the solvent and resultant oxidation of the hydride it is advisable to dry all hydride mixtures in a stream of dry air in a closed box. Mixtures which contain a very small amount of plastic, e.g., uranium hydride containing 25 percent by volume polyethylene, oxidize slowly when exposed even to dry air. These mixtures can be satisfactorily dried in a stream of propane, helium, argon, carbon dioxide or nitrogen.

Grinding of the dried mixture is not always necessary, depending on its texture. In the grinding operation care should be exercised to prevent removal of the coat of plastic from the individual particles of hydride as this will leave them unprotected against oxidation.

The best method found for compressing the ground powder into compacts consists in charging it into a die and heating to the correct pressing temperature while applying pressure with a hydraulic press. The pressing is ordinarily done using dies with double-acting punches.

The plastic bonding method of this invention has been used to make various articles such as linings for various shaped receptacles, etc. If there is no restriction on the amount of plastic used almost any desired shape can be made very easily. However, when very low percentages of plastic are necessary, for example, to obtain a high-density product, it becomes difficult to press the material into thin articles because the mixture does not flow readily.

An advantage of the invention is that it provides a method of making compacts for neutronic systems of predetermined densities and hydrogen to metal ratios from active materials such as uranium, plutonium and/or their compounds having a higher ratio of hydrogen to active material than was available heretofore. It is another advantage of the invention that it furnishes a method of making from pyrophoric metal and/or its compounds such as uranium, compacts for use with neutronic systems which are non-pyrophoric, stable in air and easily handled. In addition, the invention provides a method of making compacts comprising uranium and hydrogen in which the hydrogen to uranium ratio is greater than three.

As many apparently widely different embodiments of this invention may be made without departing from the spirit and scope thereof, it is to be understood that the invention is not limited to the specific embodiments thereof except as defined in the appended claims.

What is claimed is:

1. The method of producing non-pyrophoric stable compacts from pyrophoric materials which comprises intimately admixing at least one powdered material from the class consisting of uranium, plutonium, and hydrides thereof, with anhydrous benzene solution of a hydrocarbon plastic bonding material from the class consisting of polyethylene, polystyrene, hydrogenated polystyrene and polyisobutylene, the amount of said plastic varying from about 25 to about 95 percent by volume of the solvent-free mixture, drying the resulting mixture in an inert atmosphere, and forming compacts from the dried mixture at a pressure varying from about 2,500 to about 100,000 pounds per square inch.

2. The method of claim 1 wherein the powdered material is a mixture of uranium and uranium hydride and the plastic bonding material is polyethylene.

3. The method of claim 1 wherein the powdered material is uranium hydride and the plastic bonding material is polyethylene.

References Cited in the file of this patent

UNITED STATES PATENTS

| | | |
|---|---|---|
| 1,299,846 | McCoy | Apr. 8, 1919 |
| 1,566,793 | Gero | Dec. 22, 1925 |
| 2,205,226 | Slepian | June 18, 1940 |
| 2,238,893 | Fischer | Apr. 22, 1941 |
| 2,436,182 | Schmidling | Feb. 17, 1948 |
| 2,440,999 | Anderson | May 4, 1948 |
| 2,491,320 | Koontz | Dec. 13, 1949 |
| 2,559,259 | Raper | July 3, 1951 |
| 2,588,153 | Newton | Mar. 4, 1952 |